(12) United States Patent
Taherzadeh Boroujeni et al.

(10) Patent No.: US 12,307,364 B2
(45) Date of Patent: May 20, 2025

(54) FEDERATED LEARNING WITH VARYING FEEDBACK

(71) Applicant: QUALCOMM Incorporated, San Diego, CA (US)

(72) Inventors: Mahmoud Taherzadeh Boroujeni, San Diego, CA (US); Tao Luo, San Diego, CA (US); Hamed Pezeshki, San Diego, CA (US); Vinay Chande, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 913 days.

(21) Appl. No.: 17/479,916

(22) Filed: Sep. 20, 2021

(65) Prior Publication Data

US 2022/0101131 A1    Mar. 31, 2022

Related U.S. Application Data

(60) Provisional application No. 63/083,719, filed on Sep. 25, 2020, provisional application No. 63/083,728, filed on Sep. 25, 2020, provisional application No. 63/083,756, filed on Sep. 25, 2020.

(51) Int. Cl.
| | |
|---|---|
| *G06N 3/08* | (2023.01) |
| *G06F 17/18* | (2006.01) |
| *G06N 3/042* | (2023.01) |
| *G06N 3/084* | (2023.01) |

(52) U.S. Cl.
CPC .............. *G06N 3/08* (2013.01); *G06F 17/18* (2013.01); *G06N 3/042* (2023.01); *G06N 3/084* (2013.01)

(58) Field of Classification Search
CPC .......... G06N 3/08; G06N 3/042; G06N 3/084; G06F 17/18; H04W 88/02
See application file for complete search history.

(56) References Cited

U.S. PATENT DOCUMENTS

2023/0068386 A1*  3/2023  Akdeniz ................ G06N 3/084
2023/0345271 A1* 10/2023  Veijalainen ........... H04W 24/10

* cited by examiner

*Primary Examiner* — Gil H. Lee
*Assistant Examiner* — Chhian (Amy) Ling
(74) *Attorney, Agent, or Firm* — Seyfarth Shaw LLP

(57) ABSTRACT

A method of wireless communication, by a user equipment (UE) includes receiving, from a base station, a jointly trained artificial neural network. The method also includes calculating a value representing at least one of (1) a gradient estimate for a weight of the jointly trained artificial neural network, or (2) the weight of the jointly trained artificial neural network. The method further includes expanding the value into a numerical system with base N into a plurality of digits. The method also includes determining a number and/or a location of the plurality of digits to transmit based on a deterministic task assignment rule received from the base station or a probabilistic task assignment rule. The method further includes transmitting the determined number and/or the determined location of the plurality of digits to the base station.

30 Claims, 12 Drawing Sheets

FEDERATED LEARNING WITH VARYING FEEDBACK

CROSS-REFERENCE TO RELATED APPLICATIONS

The present application claims the benefit of U.S. Provisional Patent Application No. 63/083,719, filed Sep. 25, 2020, and titled "FEDERATED LEARNING WITH RANDOMIZED FEEDBACK BITS," U.S. Provisional Patent Application No. 63/083,728, filed Sep. 25, 2020, and titled "FEDERATED LEARNING WITH DIVIDED FEEDBACK," and U.S. Provisional Patent Application No. 63/083,756, filed Sep. 25, 2020, and titled "FEDERATED LEARNING WITH UNEQUAL FEEDBACK," the disclosures of which are expressly incorporated by reference in their entireties.

FIELD OF THE DISCLOSURE

Aspects of the present disclosure generally relate to wireless communications, and more particularly to techniques and apparatuses for federated learning with varying feedback.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipments (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

A method of wireless communication, by a user equipment (UE) includes receiving, from a base station, a jointly trained artificial neural network. The method also includes calculating a value representing at least one of (1) a gradient estimate for a weight of the jointly trained artificial neural network, or (2) the weight of the jointly trained artificial neural network; The method further includes expanding the value into a numerical system with base N into a plurality of digits. The method also includes determining a number and/or a location of the plurality of digits to transmit based on a deterministic task assignment rule received from the base station or a probabilistic task assignment rule. The method further includes transmitting the determined number and/or the determined location of the plurality of digits to the base station.

A method of wireless communication, by a base station includes assigning to each of a plurality of user equipments (UEs), a number and/or a location of digits of a value for transmission based on a deterministic task assignment rule or a probabilistic task assignment rule, the value representing at least one of (1) a gradient estimate of a weight of a jointly trained artificial neural network or (2) the weight of the neural network. The method also includes transmitting the deterministic task assignment rule or the probabilistic task assignment rule to the plurality of UEs. The method further includes receiving, from each of the plurality of UEs, the number and/or location of a plurality of digits of the value, in accordance with the assigning. The method also includes training the neural network based on the plurality of digits received from the plurality of UEs.

A user equipment (UE) includes a processor and a memory coupled with the processor. The UE also includes instructions stored in the memory. When the instructions are executed by the processor, the UE is operable to receive, from a base station, a jointly trained artificial neural network. The UE is also operable to calculate a value representing at least one of (1) a gradient estimate for a weight of the jointly trained artificial neural network, or (2) the weight of the jointly trained artificial neural network. The UE is further operable to expand the value into a numerical system with base N into a plurality of digits. The UE is also operable to determine a number and/or a location of the plurality of digits to transmit based on a deterministic task assignment rule received from the base station or a probabilistic task assignment rule. The UE is further operable to transmit the determined number and/or the determined location of the plurality of digits to the base station.

A base station includes a processor and a memory coupled with the processor. base station includes instructions stored in the memory. When the instructions are executed by the processor, the base station is operable to assign to each of a plurality of user equipments (UEs), a number and/or a location of digits of a value for transmission based on a deterministic task assignment rule or a probabilistic task assignment rule, the value representing at least one of (1) a gradient estimate of a weight of a jointly trained artificial neural network or (2) the weight of the neural network. The base station is also operable to transmit the deterministic task assignment rule or the probabilistic task assignment rule to the plurality of UEs. The base station is further operable to receive, from each of the plurality of UEs, the number and/or location of a plurality of digits of the value, in accordance with the assigning. The base station is also operable to train the neural network based on the plurality of digits received from the plurality of UEs.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
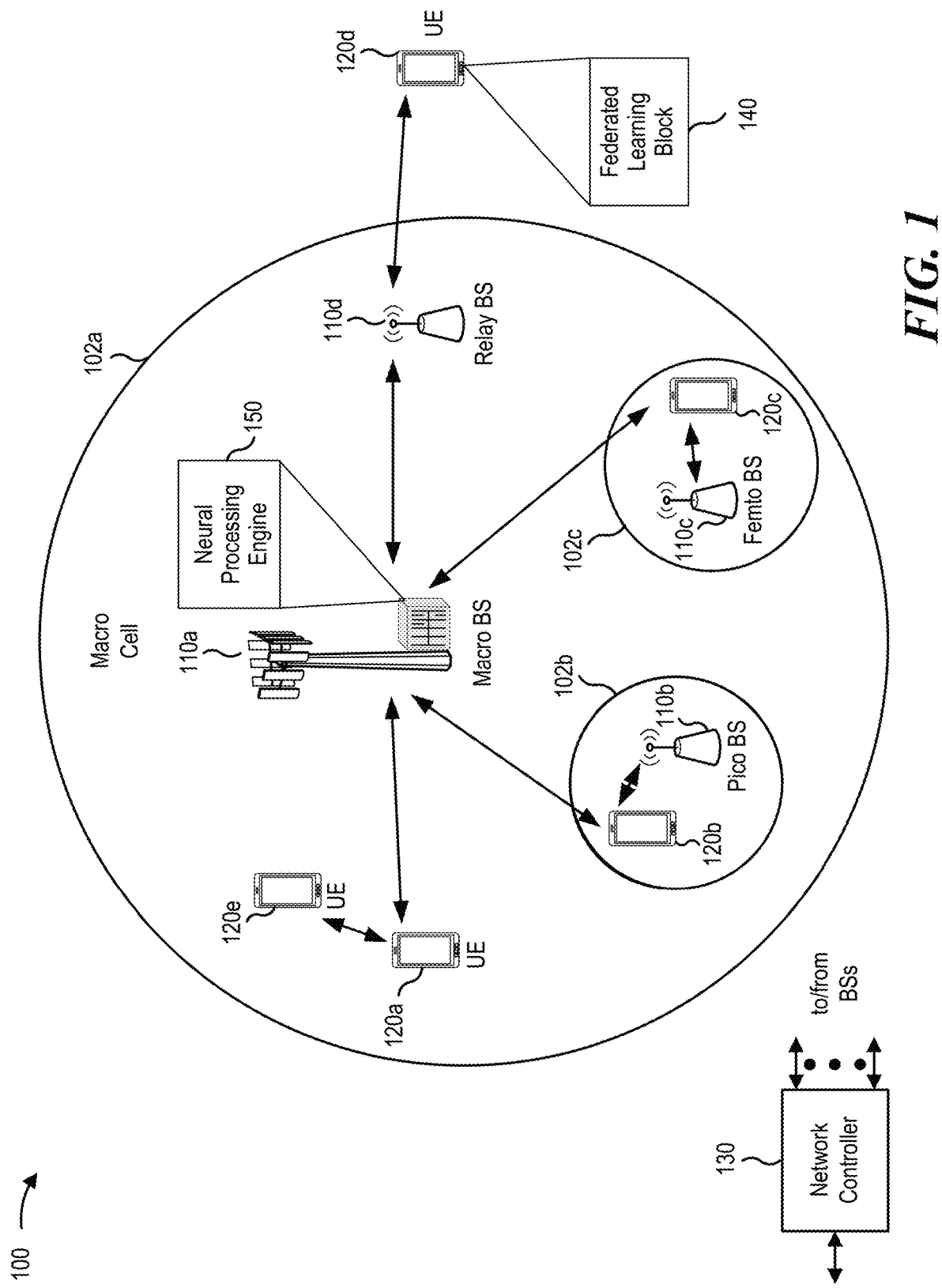
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A user equipment (UE) may be configured with a federated learning model. While standard machine learning approaches centralize training data on one machine, or in a data center, a federated learning model supports collaborative learning of a shared prediction model among UEs and a base station. This collaborative learning is performed while keeping all the training data at the UEs. Federated learning enables the UEs to collaboratively learn a shared prediction model while keeping the training data at the UEs. For example, the UEs are equipped with a shared prediction model to collectively train the prediction model directly while the UEs operate. This avoids transferring voluminous data between the UEs and data servers, which reduces the costs of data transmission and data storage while preserving data privacy.

Federated learning may provide privacy-preservation for a UE. In particular, because the training model is on the UE, uploading of data to a centralized database is avoided. Rather, a federated learning model is configured to upload "gradients" (e.g., model updates) to a centralized server (e.g., a base station) and the gradients can be also encrypted. According to this configuration, edge devices (e.g., UEs) can enjoy a shared model upgrade, while retaining data locally and privately. Gradient-based updates are cost efficient because large-scale raw data transmission/management of conventional machine learning approaches is avoided. That is, federated learning reduces storing of data in the cloud when performing machine learning.

In federated learning, local calculations of gradients (for training of a jointly-used neural network) are gathered from several devices and an average (or another type of aggregate estimate) is transmitted back from the base station to the UEs. Federated learning is a process where a group of UEs receives a machine learning model from a base station and works together to train the model. More specifically, each UE trains the model locally, and sends back either updated neural network model weights or gradient updates from, for example, a locally performed stochastic gradient descent process. The base station receives the updates from all of the UEs in the group and aggregates them, for example by averaging them, to obtain updated global weights of the neural network. The base station sends the updated model to the UEs, and the process repeats, round after round, until a desired performance level from the global model is obtained.

In aspects of the present disclosure, a federated learning process trains a jointly-used artificial neural network, in which each UE calculates an estimated gradient, and/or the weights themselves. Once calculated, the UE randomly transmits a "j'th" digit of the gradient or weight according to a probability function (e.g., Pr(j)), which may be referred to as a probabilistic task assignment rule. For example, in a numerical system of base N, the probability of transmitting the j'th digit may be equal to $Pr(j)=1/(N^j)$. In an example with a binary system, each UE may transmit the j'th digit of its local estimation of the gradient with the probability function $Pr(j)=1/(2^j)$.

In one configuration, the probability Pr(j) is configured by the base station. For example, the network may calculate the optimum values of Pr(j) based on estimates of a channel condition estimate and an amount of distortion caused by an error in each digit. Alternatively, the probability Pr(j) may be configured as a static value for some digits and/or for some devices.

In some aspects of the present disclosure, a federated learning process jointly trains an artificial neural network received from a base station. In response to the received neural network, each UE calculates a value. The value represents (1) a gradient estimate of a weight of the neural network and/or (2) the weight of the neural network. Once calculated, each of the UEs expands the value into a numerical system with base N into a sequence of digits. In these aspects of the present disclosure, each of the UEs determines a number of digits and digit locations of the sequence of digits to transmit based on a task assignment received from the base station. Each of the UEs then transmits the determined number of digits according to the digit location to the base station. For example, a UE transmits a "j'th" digit of a gradient estimate or a weight according to an indication from the base station. In this example, the feedback from the UEs is unequal, which may vary according to channel conditions, quality of the gradient estimates and weights, or other metrics determined by the base station.

In one configuration, the number of digits as well as the digit locations are configured by the base station. For example, the network may determine the optimum values transmitted by the UE based on estimates of a channel condition estimate and an amount of distortion caused by an error in each digit. Alternatively, the number of digits and the digit locations may be configured as static values for some digits and/or for some devices.

In other aspects of the present disclosure, each of the UEs determines whether to transmit each j'th digit of the digits based on a deterministic task assignment rule received from the base station. Each of the UEs then transmits, to the base station, each j'th digit of the digits that should be transmitted. For example, a UE transmits a j'th digit of a gradient estimate or a weight according to the deterministic task assignment rule received from the base station. In this example, the feedback from the UEs is divided, which may vary according to channel conditions, quality of the gradient estimates and weights, or other metrics determined by the base station.

In some configurations, the deterministic task assignment rule for each j'th digit of the gradient estimate or the weight is configured by the base station. For example, the network may determine the optimum values transmitted by the UE based on estimates of a channel condition estimate and an amount of distortion caused by an error in each digit. The base station may assign the digit location "j" differently for different devices, depending on each individual channel condition. For example, the base station may assign more significant digits to more reliable links. In addition, the deterministic task assignment rule may be directed to a block of digits. Alternatively, the number of digits and the digit locations may be configured as static values for some digits and/or for some devices.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

The UEs 120 may include a federated learning block 140. For brevity, only one UE 120d is shown as including the federated learning block 140. In certain aspects, a UE, such as the UE 120, may include the federated learning block 140 configured to receive, from a base station, a jointly trained artificial neural network. The federated learning block 140 may also be configured to calculate a value representing at least one of (1) a gradient estimate for a weight of the jointly trained artificial neural network, or (2) the weight of the jointly trained artificial neural network. The federated learning block 140 may be configured to expanding the value into a numerical system with base N into a plurality of digits. The federated learning block 140 may also be configured to determine a number and/or a location of the plurality of digits to transmit based on a deterministic task assignment rule received from the base station or a probabilistic task assignment rule; and to transmit the determined number and/or the determined location of the plurality of digits to the base station.

The base station 110 may include a neural processing engine 150. For brevity, only one base station 110a is shown as including the neural processing engine 150, but a neighbor base station may also include the neural processing engine 150. In certain aspects, a base station, such as the base station 110, may include the neural processing engine 150 configured to assign to each of a plurality of user equipments (UEs), a number and/or a location of digits of a value for transmission based on a deterministic task assignment rule or a probabilistic task assignment rule, the value representing at least one of (1) a gradient estimate of a weight of a jointly trained artificial neural network or (2) the weight of the neural network. The neural processing engine 150 may also be configured to transmit the deterministic task assignment rule or the probabilistic task assignment rule to the plurality of UEs; and to receive, from each of the plurality of UEs, the number and/or location of a plurality of digits of the value, in accordance with the assigning. The neural processing engine 150 may also be configured to training the neural network based on the plurality of digits received from the plurality of UEs.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
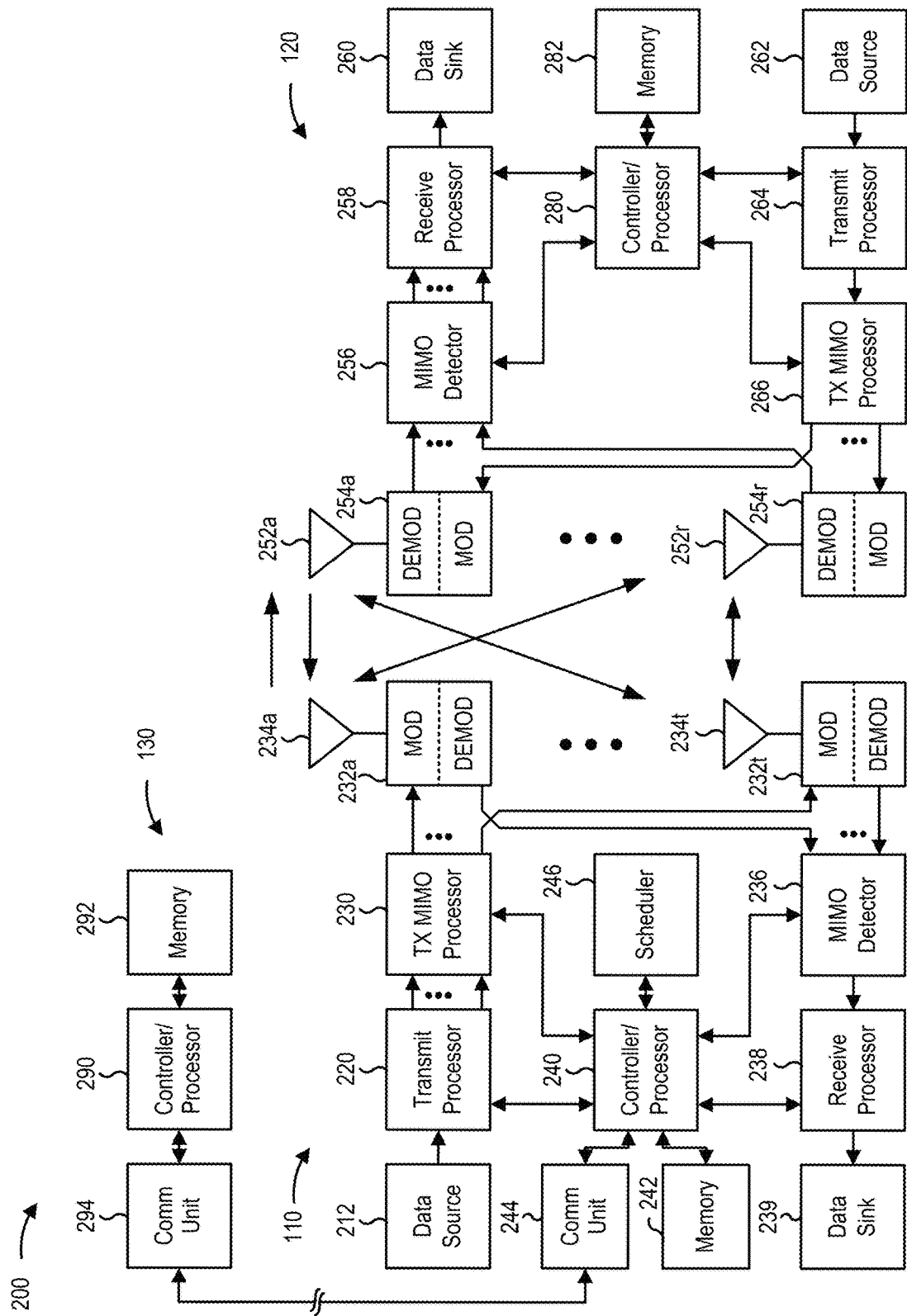
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with federated learning with varying feedback, as described in more detail elsewhere. For example, the controller/processor 240 of the base station 110, the controller/processor 280 of the UE 120, and/or any other component(s) of FIG. 2 may perform or direct operations of, for example, the process of FIG. 10 or 11 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for calculating, means for expanding, means for determining, and/or means for transmitting. In some aspects, the base station 110 may include means for calculating, means for transmitting, means for receiving, and/or means for training. Such means may include one or more components of the base station 110 or the UE 120 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
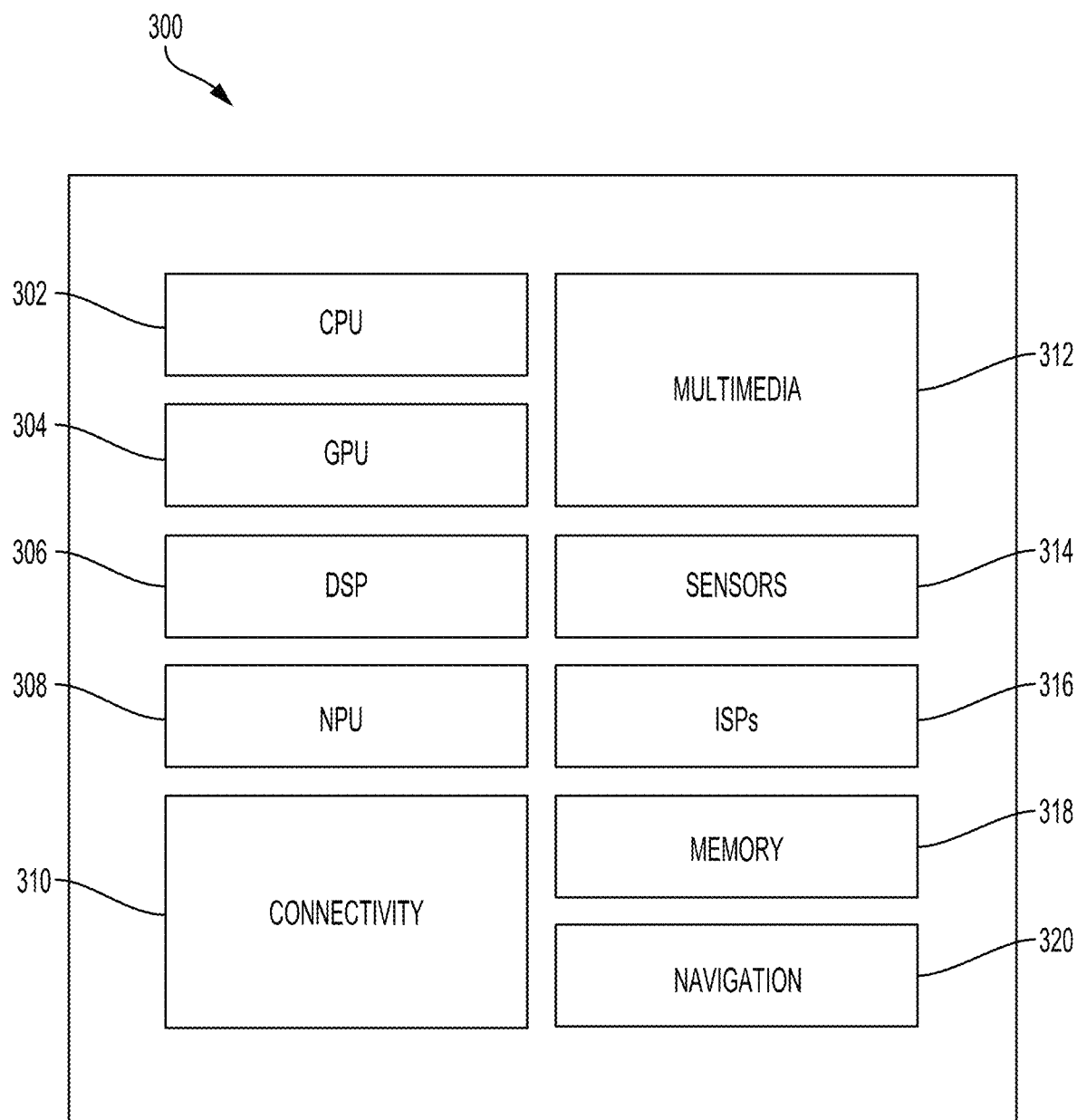
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive, from a base station, a jointly trained artificial neural network; code to calculate a value representing at least one of (1) a gradient estimate for a weight of the jointly trained artificial neural network, or (2) the weight of the jointly trained artificial neural network; code to expand the value into a numerical system with base N into a plurality of digits; code to determine whether to transmit a j'th digit of the plurality of digits based on a probability function; and code to transmit each of the plurality of digits to the base station, for the j'th digit that is determined to be transmitted.

In aspects of the present disclosure, the instructions loaded into the general-purpose processor 302 may comprise code to calculate a probability function for each digit of a value representing at least one of (1) a gradient estimate of a weight of a jointly trained artificial neural network or (2) the weight of the neural network; code to transmit the probability function to a plurality of user equipments (UEs); code to receive, from each of the plurality of UEs, a plurality of digits of the value, in accordance with the probability function; and code to train the neural network based in the plurality of digits received from the plurality of UEs.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
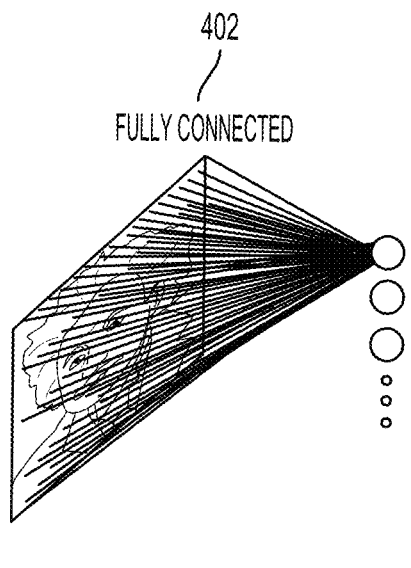
FIGS. 4A, 4B, and 4C are diagrams illustrating a neural network, in accordance with aspects of the present disclosure.
Figure 4B:
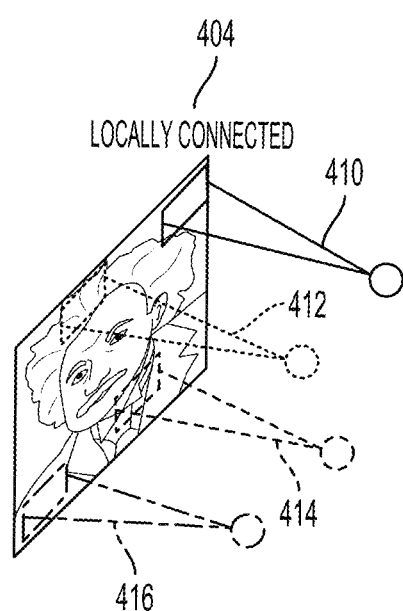

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
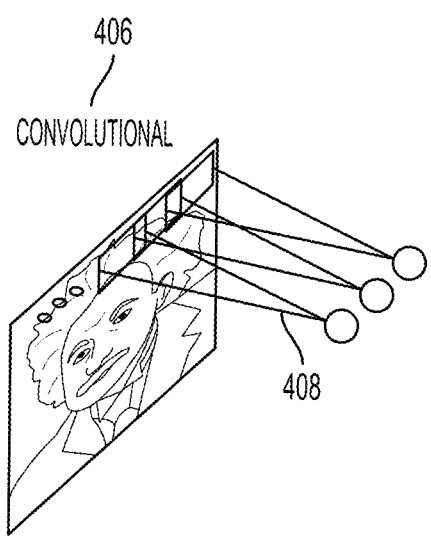

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
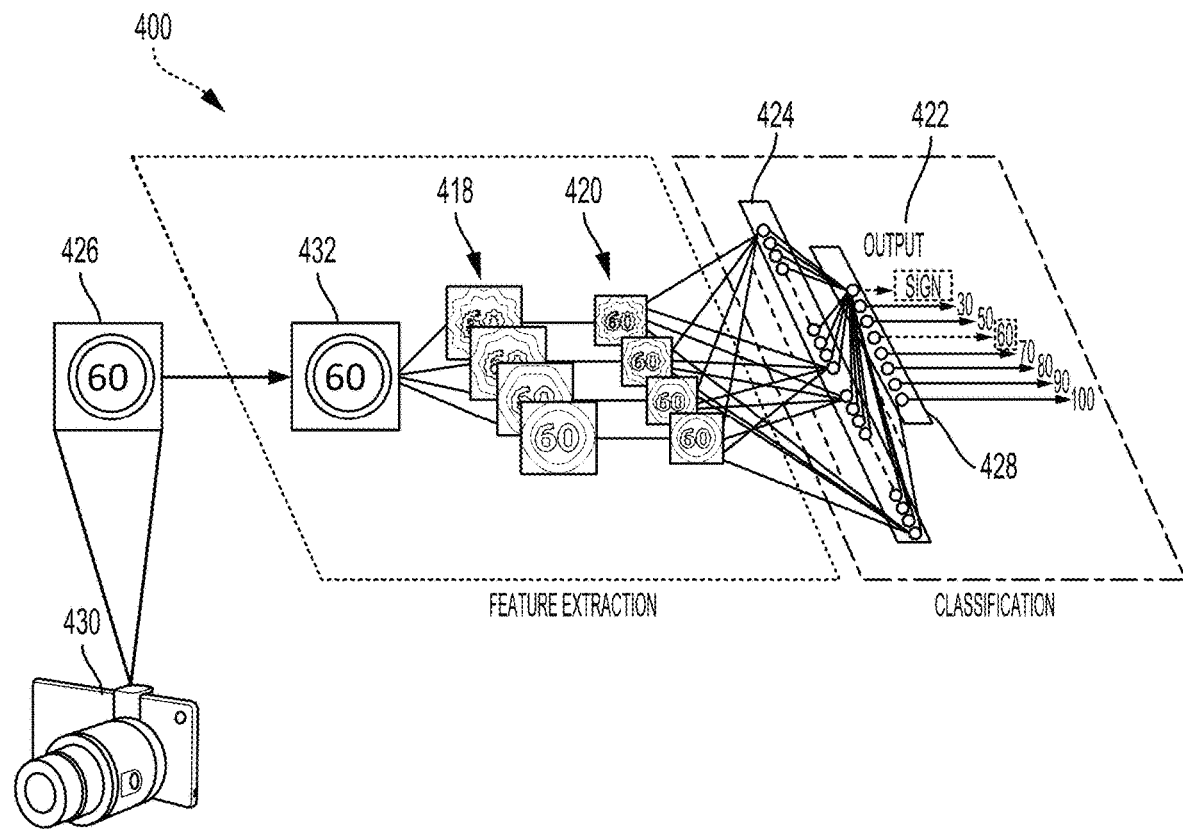
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
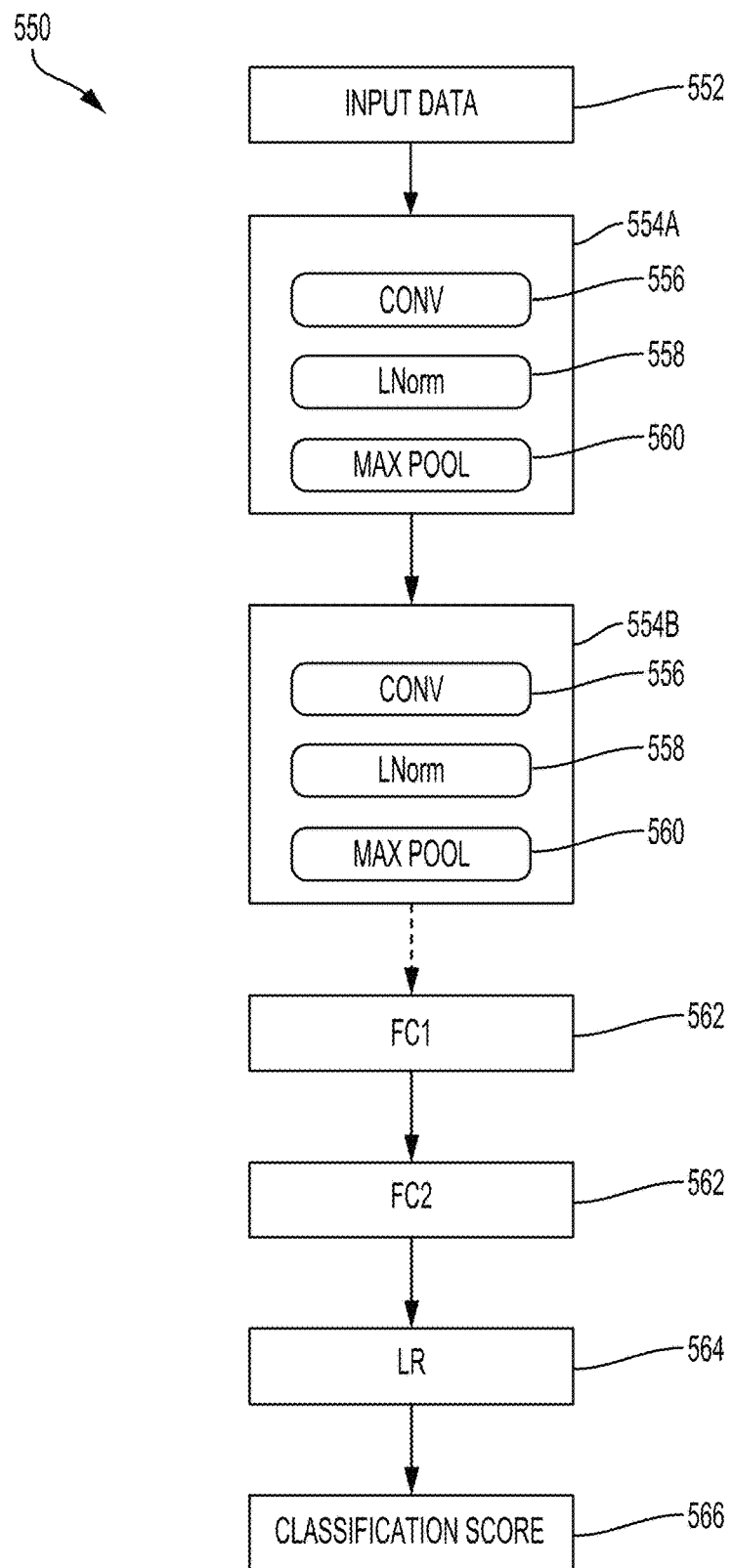
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 556, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As noted above, standard machine learning approaches centralize training data on one machine, or in a data center. In contrast, federated learning is a process where a group of UEs receives a machine learning model from a base station and works together to train the model. More specifically, each UE trains the model locally, and sends back either updated neural network model weights or gradient updates from, for example, a locally performed stochastic gradient descent process. The base station receives the updates from all of the UEs in the group and aggregates them, for example by averaging them, to obtain updated global weights of the neural network. The base station sends the updated model to the UEs, and the process repeats, round after round, until a desired performance level from the global model is obtained.

In aspects of the present disclosure, a federated learning process trains a jointly-used artificial neural network, in which each UE calculates an estimated gradient, and/or the weights themselves. Once calculated, the UE randomly transmits a "j'th" digit of the gradient or weight according to a probability function (e.g., Pr(j)), which may be referred to as a probabilistic task assignment rule. For example, in a numerical system of base N, the probability of transmitting the j'th digit may be equal to $Pr(j)=1/(N^j)$. In an example with a binary system, each UE may transmit the j'th digit of its local estimation of the gradient with the probability function $Pr(j)=1/(2^j)$.

In some aspects of the present disclosure, a federated learning process jointly trains an artificial neural network received from a base station. In response to the received neural network, each UE calculates a value. The value represents (1) a gradient estimate of a weight of the neural network and/or (2) the weight of the neural network. Once calculated, each of the UEs expands the value into a numerical system with base N into a sequence of digits.

In these aspects of the present disclosure, each of the UEs determines a number of digits and digit locations of the sequence of digits to transmit based on a task assignment received from the base station. Each of the UEs then transmits the determined number of digits according to the digit location to the base station. For example, a UE transmits a "j'th" digit of a gradient estimate or a weight according to an indication from the base station. In this example, the feedback from the UEs is unequal, which may vary according to channel conditions, quality of the gradient estimates and weights, or other metrics determined by the base station.

In other aspects of the present disclosure, each of the UEs determines whether to transmit each j'th digit of the digits based on a deterministic task assignment rule received from the base station. Each of the UEs then transmits, to the base station, each j'th digit of the digits that should be transmitted. For example, a UE transmits a j'th digit of a gradient estimate or a weight according to the deterministic task assignment rule received from the base station. In this example, the feedback from the UEs is divided, which may vary according to channel conditions, quality of the gradient estimates and weights, or other metrics determined by the base station.

Figure 6:
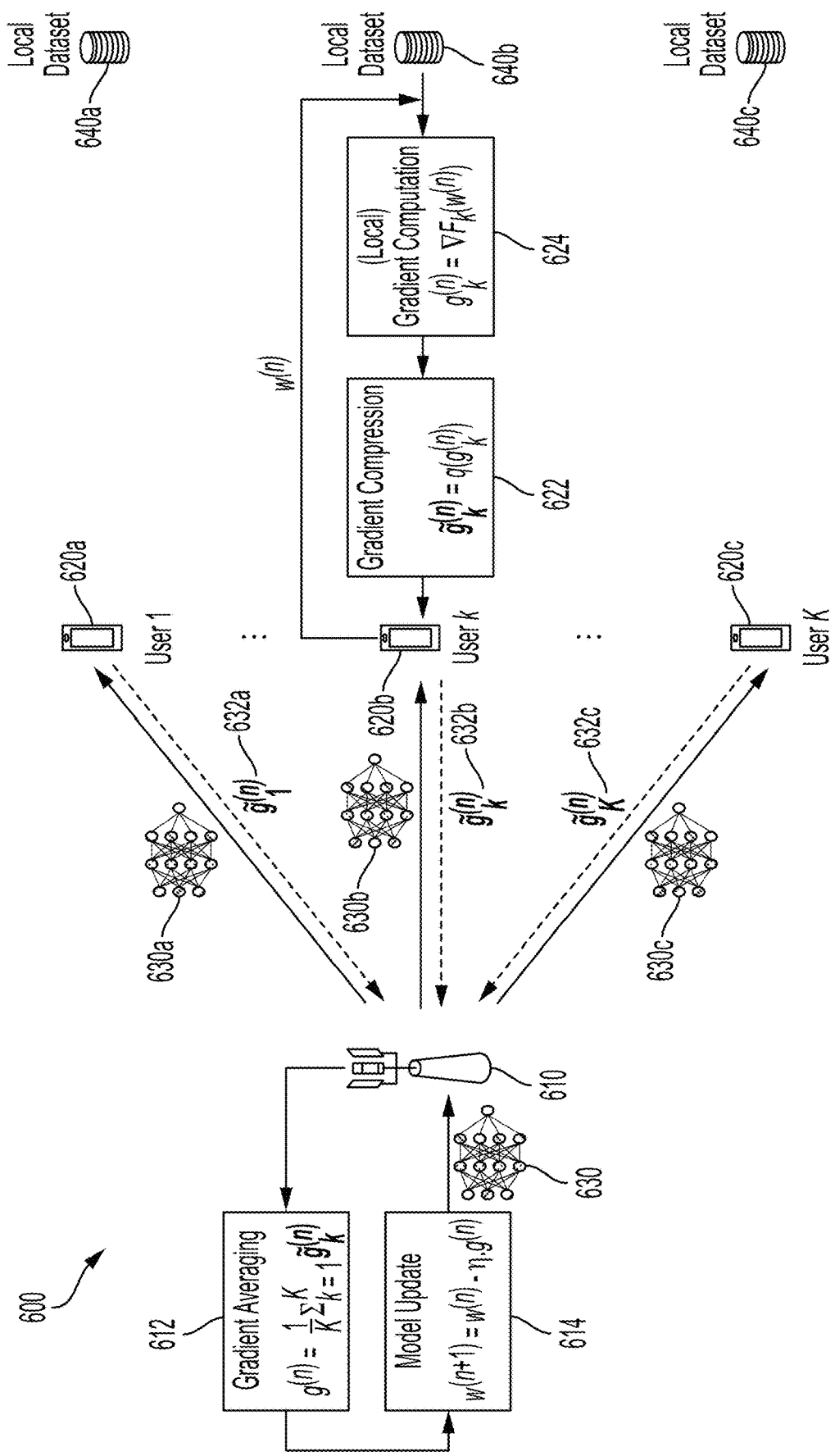
FIG. 6 is a block diagram illustrating a federated learning system, according to aspects of the present disclosure.

FIG. 6 is a block diagram illustrating a federated learning system 600, according to aspects of the present disclosure. In one configuration, a base station 610 (e.g., gNB) shares a global federated learning model 630 (e.g., 630a, 630b, 630c) with a group of user equipments (UEs) 620 (e.g., 620a, 620b, and 620c) participating in the federated learning process. In this configuration, the model parameters are optimized by the federated learning system 600. The model parameters $w^{(n)}$ represent a gradient estimate of a weight of the global federated learning model or the weight itself, where n is a federated learning round index. The initial model parameters are designated as $w^{(0)}$.

In this configuration, the UEs 620 each include a local dataset 640 (e.g., 640a, 640b, 640c), a gradient computation block 624, and a gradient compression block 622. In this example, the gradient computation block 624 of the UE 620b is configured to perform a local update through a decentralized process, such as stochastic gradient descent (SGD). Each of the UEs 620 performs a training iteration, such as a single stochastic gradient descent step or multiple stochastic gradient descent steps as seen in equation (1):

$$g_k^{(n)} = \nabla F_k(w^{(n)}) \quad (1)$$

where $F_k(w^{(n)})$ represents a local loss function for a weight w for the n federated learning round and $g_k^{(n)}$ represents a local gradient, for the n federated learning round.

After the UEs 620 have completed the local updates $g_k^{(n)}$, the gradient compression block 622 may compress the computed gradient vector $g_k^{(n)}$ as seen in equation (2), to obtain compressed computed gradient values $\tilde{g}_k^{(n)}$ (e.g., 632a, 632b, 632c), where q( ) represents a compression function:

$$\tilde{g}_k^{(n)} = q(g_k^{(n)}) \quad (2)$$

In this configuration, the base station 610 includes a gradient averaging block 612 configured to average the compressed computed gradient values $\tilde{g}_k^{(n)}$ 632. Although averaging is shown, other types of aggregation are also contemplated. In addition, a model update block 614 is configured to update parameters of the global federated learning model 630. The updated model is then sent to all of the UEs 620. This process repeats until a global federated learning accuracy specification is met (e.g., until a global federated learning algorithm converges).

This global federated learning algorithm is based on a local loss function:

$$F_k(w) = \frac{1}{|D_k|} \Sigma_{(x_j, y_j) \in D_k} f(w, x_j, y_j) \quad (3)$$

where $x_j$ represents an input vector to the model, $y_j$ represents an output vector from the model, w is a weight vector of the global federated learning model, and $D_k$ is a local dataset size at the $k^{th}$ UE.

This global federated learning algorithm is also based on a global loss function F(w) (assuming $|D_k|=D$):

$$F(w) = \frac{\sum_{k=1}^{K} \sum_{j \in D_k} f_j(w)}{K \cdot D} = \frac{1}{K} \sum_{k=1}^{K} F_k(w) \quad (4)$$

In addition, a goal of this federated learning process is to minimize the global loss function to obtain the optimal weights w*:

$$w^* = \text{argmin } F(w) \quad (5)$$

In this federated learning process, local calculations of compressed computed gradient values $\tilde{g}_k^{(n)}$ 632 (e.g., for updating of a global federated learning model 630) are gathered from the UEs 620, and the gradient averaging block 612 computes an average (or another type of aggregate estimate) as follows:

$$g^{(n)} = \frac{1}{K} \sum_{k=1}^{K} g_k^{(n)} \quad (6)$$

The base station 610 transmits (e.g., broadcasts) the average gradient $g^{(n)}$ to the UEs 620. In addition, the model update block 614 of the base station 610 performs a model update as seen in equation (6):

$$w^{(n+1)} = w^{(n)} - \eta \cdot g^{(n)} \quad (6)$$

where η represents a learning rate, which is a parameter of the global federated learning model 630.

One federated learning approach relies on each of the UEs 620 to quantize local gradients by one bit and send the quantized value to the base station 610. The base station 610 then returns an averaged gradient. Unfortunately, convergence of this federated learning approach does not scale well with the number of UEs 620 because distortion in the gradient caused by quantization error is dominant. A distributed compression approach proposes that for aggregate estimation of a common or correlated sensed parameter, different sensors send different bits with different probabilities. How to perform federated learning with limited feedback (e.g., in terms of number of bits) should be addressed. The new process should scale well with a large number of UEs.

Figure 7:
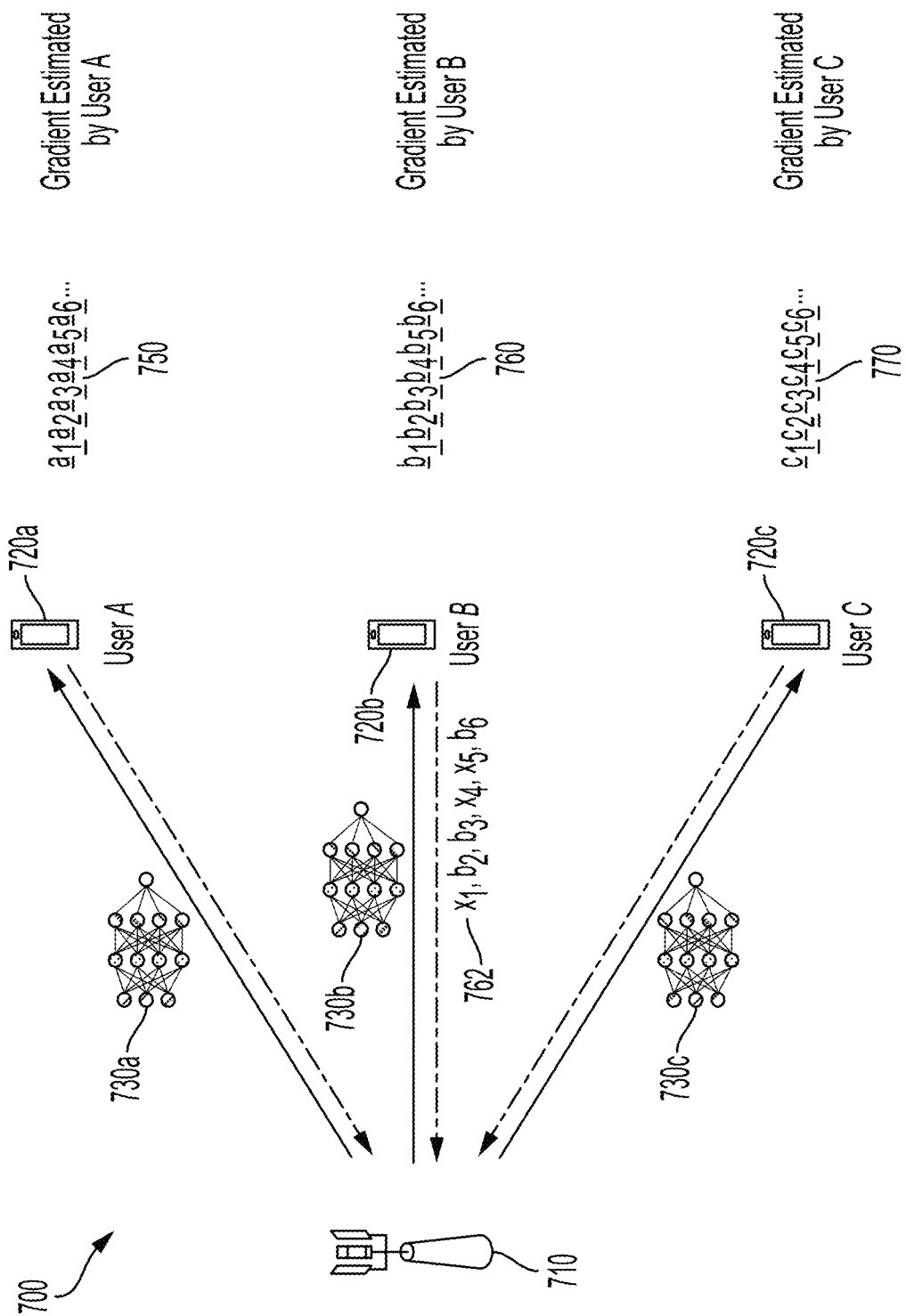
FIG. 7 is a block diagram illustrating federated learning using varying feedback, according to aspects of the present disclosure.

FIG. 7 is a block diagram illustrating federated learning using varying feedback, according to aspects of the present disclosure. In aspects of the present disclosure, a federated learning system 700 performs a process for training a jointly trained artificial neural network 730 (e.g., 730a, 730b, 730c), in which each UE 720 (e.g., 720a, 720b, 720c) calculates an estimated gradient, and/or the weights themselves. The UEs 720 calculate the estimated gradient by, for example, optimizing the weights for the jointly trained artificial neural network 730. Once calculated, the UEs 720 randomly transmit a "j'th" digit of its expansion in some type of numerical system according to a probabilistic task assignment rule (e.g., a probability function: Pr(j)). The numerical system may be a decimal, binary, or hexadecimal system, for example. The j digits may start from the most significant digit, according to some aspects of the present disclosure.

For example, in a numerical system with base N, the probability of transmitting the j'th digit may be equal to Pr(j)=1/(N). In an example with a binary system, each connected device may transmit the j'th bit of its local estimation with a probability of Pr(j)=1/($2^j$). The UE may start from the most significant bit (MSB) of the binary expansion in this example.

As shown in FIG. 7, the UE 720a generates an estimated gradient 750 (e.g., $a_1a_2a_3a_4a_5a_6$ ... ), the UE 720b generates an estimated gradient 760 (e.g., $b_1b_2b_3b_4b_5b_6$ ... ), and the UE 720c generates an estimated gradient 770 (e.g., $c_1c_2c_3c_4c_5c_6$ ... ). Based on the probability function Pr(j), each bit of the estimated gradient 760 has a different likelihood of transmitting. The first gradient bit $b_1$ has the highest probability of transmitting, with the probability decreasing when moving from the most significant bit (MSB) to the least significant bit (LSB) or a least significant digit of the estimated gradient 760. For example, a first bit $b_1$ of the estimated gradient 760 has a fifty percent (50%=1/$2^1$=1/2) probability of transmitting. A second bit $b_2$ of the estimated gradient 760 has a twenty-five percent (25%=1/$2^2$=1/4) probability of transmitting. A third bit $b_3$ of the estimated gradient 760 has a twelve and a half percent (12.5%=1/$2^3$=1/8) probability of transmitting. A fourth bit $b_4$ of the estimated gradient 760 has a six and one quarter percent (6.25%=1/$2^4$=1/16) probability of transmitting. A fifth bit $b_5$ of the estimated gradient 760 has a three and one eighth percent (3.125%=1/$2^5$=1/32) probability of transmitting. A sixth bit $b_6$ of the estimated gradient 760 has a one and a half percent (1.5%=1/$2^6$=1/64) probability of transmitting.

In the example shown in FIG. 7, the UE 720b transmits gradient bits 762 (e.g., $x_1$, $b_2$, $b_3$, $x_4$, $x_5$, $b_6$) of the estimated gradient 760 to the base station 710, in which an $x_n$ represents a non-transmitted gradient bit (e.g., $b_1$, $b_4$, $b_5$) and $b_n$ represents a transmitted gradient bit (e.g., $b_2$, $b_3$, $b_6$). In the example of FIG. 7, the UE does not transmit a first bit $b_1$, even though the probability of transmission is 50% for the first bit $b_1$. Instead, a second gradient bit $b_2$, a third gradient bit $b_3$, and a sixth gradient bit $b_6$ are transmitted to the base station 710. In one example configuration, during operation, the UE generates a random number between one and one-hundred (1 and 100). The UE 720b is configured to transmit a gradient bit when the probability of transmitting is greater than the random number generated between 1 and 100. Although described with reference to estimated gradients (e.g., 750, 760, 770), it should be recognized that aspects of the present disclosure also apply to computed weights of the jointly trained artificial neural network 730.

In one configuration, the probability Pr(j) is configured by a network. For example, the network may calculate desirable or even optimum values of Pr(j) based on estimates of conditions of a channel between the UE and the base station. The estimates may be based on an instantaneous channel condition or an average channel condition. For example, the base station may set the probability Pr(j) based on a probability of an error caused by an imperfect channel. The base station may also set a probabilistic task assignment rule (e.g., the probability function Pr(j)) based on an amount of distortion caused by an error in each digit. The probability function may be based, for example, on a rate-distortion tradeoff.

Alternatively, the probability Pr(j) may be configured as a one (or some other constant) for deterministic feedback of that digit. The deterministic value may be set for some digits and/or for some devices. For example, the base station may want to ensure a minimum amount of feedback is received for particular digits. In another example, a device with an excellent channel may be set to one to ensure feedback is received from that device.

For estimated gradient vectors, the proposed method may apply for all or some of the entries of the vector. In other aspects, the method may apply to a specific direction of the vector. For example, the method may apply to a projection of the estimated gradient vector over the specific direction.

In aspects of the present disclosure, the UEs 720 (e.g., 720a, 720b, 720c) perform a method of federated learning through wireless communications of varying gradient feedback. According to this federated learning process, the UEs 720 receive, from the base station 710, the jointly trained artificial neural network 730 (e.g., 730a, 730b, 730c). Once received, the UEs 720 calculate a value representing at least one of (1) a gradient (e.g., 750, 760, 770) estimated for a weight of the jointly trained artificial neural network 730, or (2) a weight of the jointly trained artificial neural network 730. Once calculated, the UEs 720 expand the value into a numerical system with a base N into digits of weights or estimated gradients (e.g., 750, 760, 770).

The UEs 720 then determine whether to transmit a j'th digit of the digits of the estimated gradient or weight (e.g., 750, 760, 770) based on a probability function. For example, the UE 720b of user B generates an estimated gradient 760 ($b_1b_2b_3b_4b_5b_6$ ... ), which may be for a base 2 (e.g., a binary system) numerical system. In this example, whether to transmit a particular bit, j, is determined by the probability function Pr(j) for the j'th bit (e.g., $b_3$ for j=3) of the estimated gradient 760 ($b_1b_2b_3b_4b_5b_6$ ... ). For example, the UE 720b transmits gradient bits 762 (e.g., $x_1$, $b_2$, $b_3$, $x_4$, $x_5$, $b_6$) of the estimated gradient 760 to the base station 710, in which an $x_n$ represents a non-transmitted gradient bit (e.g., $b_1$, $b_4$, $b_5$) and $b_n$ represents a transmitted gradient bit (e.g., $b_2$, $b_3$, $b_6$). In this example, the UE does not transmit a first gradient bit $b_1$, although the probability of transmission is 50%. Instead, a second gradient bit $b_2$, a third gradient bit $b_3$, and a sixth gradient bit $b_6$ are transmitted to base station 710 within the gradient bits 762. Once determined, the UEs 720 (e.g., 720a, 720b, 720c) transmit each of the digits of the estimated gradient or weight (e.g., 750, 760, 770) to the base station 710, for each j'th digit that is determined to be transmitted. In this example, the UE 720b does not transmit the first gradient bit $b_1$, the fourth gradient bit $b_4$, or the fifth gradient bit $b_5$ of the estimated gradient 760 to the base station 710.

Figure 8:
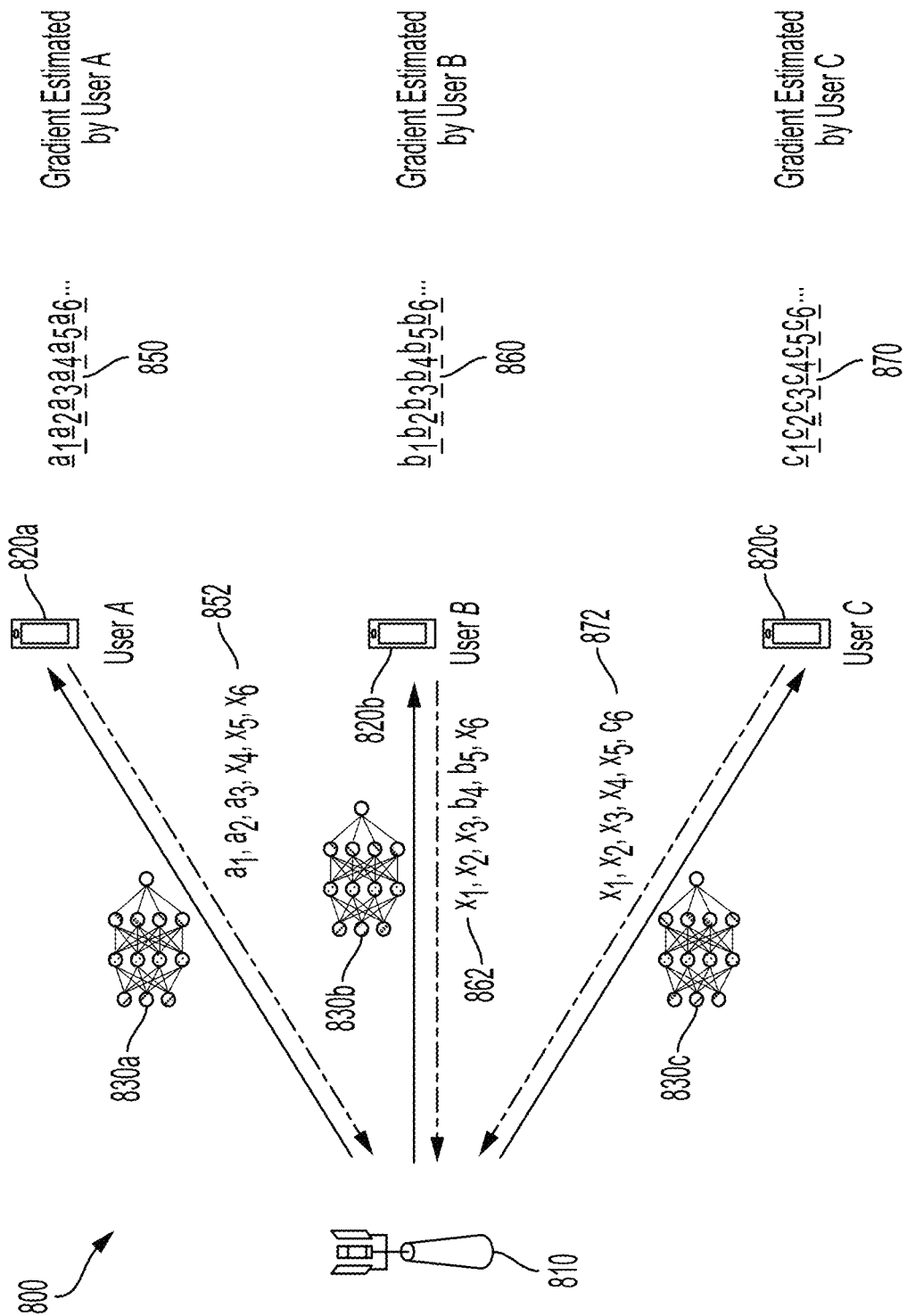
FIG. 8 is a block diagram illustrating federated learning using divided feedback, according to aspects of the present disclosure.

FIG. 8 is a block diagram illustrating federated learning using divided feedback, according to aspects of the present disclosure. In aspects of the present disclosure, a federated learning system 800 performs a process for training a jointly trained neural network 830 (e.g., 830a, 830b, 830c). In this configuration, each UE 820 (e.g., 820a, 820b, 820c) calculates a value representing (1) a gradient estimate of a weight of the neural network and/or (2) the weight of the neural network. Once calculated, each of the UEs 820 (e.g., 820a, 820b, 820c) expands the value into a numerical system with base N into a sequence of digits. The numerical system may be a decimal, binary, or hexadecimal system, for example. The j digits may start from the most significant digit and expand to a least significant digit, according to some aspects of the present disclosure.

As shown in FIG. 8, the UE 820a generates an estimated gradient 850 (e.g., $a_1a_2a_3a_4a_5a_6$ ... ), the UE 820b generates an estimated gradient 860 (e.g., $b_1b_2b_3b_4b_5b_6$ ... ), and the UE 820c generates an estimated gradient 870 (e.g., $c_1c_2c_3c_4c_5c_6$ ... ). Once generated, each of the UEs 820 (e.g., 820a, 820b, 820c) determines whether to transmit each j'th digit of their estimated gradient (e.g., 850, 860, 870)

based on a deterministic task assignment rule received from the base station 810. For example, assuming a binary system (e.g., base 2), the UE 820a transmits gradient bits 852 (e.g., $a_1, a_2, a_3, x_4, x_5, x_6$) of the estimated gradient 850 to the base station 810. In this example, an $x_n$ represents a non-transmitted gradient bit (e.g., $a_4, a_5,$ and $a_6$) and an represents a transmitted gradient bit (e.g., $a_1, a_2, a_3$). That is, the UE 820a transmits the most significant bit $a_1$, the second most significant bit $a_2$, and the next most significant bit $a_3$ to the base station 810. The UE 820a does not transmit the remaining bits (e.g., $a_4$, as, and $a_6$) of the estimated gradient 850. In this example, the base station 810 assigns the most significant gradient bits (e.g., $a_1, a_2, a_3$) to the UE 820a, for example, because the UE 820a exhibits a highest average (or instantaneous) channel condition relative to the other ones of the UEs 820.

By contrast, the UE 820b transmits gradient bits 862 (e.g., $x_1, x_2, x_3, b_4, b_5, x_6$) of the estimated gradient 860 to the base station 810. In the example of FIG. 8, the UE 820b does not transmit a most significant bit $b_1$, a second most significant bit bz, a third bit $b_3$, or a sixth bit $b_6$ to the base station 810. Instead, a fourth gradient bit $b_4$, and a fifth gradient bit $b_5$ are transmitted to the base station 810 in the gradient bits 862. In addition, the UE 820c transmits gradient bits 872 (e.g., $x_1, x_2, x_3, x_4, x_5, c_6$) of the estimated gradient 870 to the base station 810. The UE 820c does not transmit a most significant bit $c_1$, a second bit $c_2$, the third bit $c_3$, a fourth bit $c_4$, or a fifth bit $c_5$ to the base station 810. Instead, the least significant gradient bit $c_6$ is transmitted to the base station 810 in the gradient bits 872.

Each of the UEs 820 is instructed to transmit each j'th digit within the estimated gradients (e.g., 850, 860, 870) to the base station 810 based on the received task assignment. In this aspect of the present disclosure, the estimated gradient feedback in the gradient bits (e.g., 852, 862, 872) from the UEs 820 is divided according to channel conditions, quality of the gradient estimates and weights, or other deterministic metrics determined by the base station. For example, the base station may assign more significant bits to a larger number of devices. In particular, the base station 810 adjusts the requested gradient feedback according to channel conditions, quality of the gradient estimates, importance of the bits, weights, and/or other metric determined by the base station 810.

In this example, the UE 820a exhibits a highest average channel condition relative to the UE 820b and the UE 820c. That is, the UE 820a provides the more reliable link relative to the UE 820b and the UE 820c. The UE 820b may exhibit a next highest average channel condition and receives the assignment of transmitting the fourth gradient bit $b_4$ and the fifth gradient bit $b_5$ to the base station 810 in the gradient bits 862. The UE 820c provides the least reliable link and is limited to transmitting the least significant bit $c_6$.

In this example, the feedback from the UEs 820 is divided, which may vary according to channel conditions, quality of the gradient estimates and weights, or other deterministic metric determined by the base station. Although described with reference to estimated gradient vectors (e.g., 850, 860, 870), it should be recognized that aspects of the present disclosure also apply to computed weights of the jointly trained neural network 830.

For the estimated gradient vectors (e.g., 850, 860, 870), the proposed method may apply for all or some of the entries of the vector. In other aspects, the method may apply to a specific direction of the vector. For example, the method may apply to a projection of the estimated gradient vector over the specific direction. According to this method, the base station 810 assigns at least one digit location of a value representing (1) a gradient estimate of a weight of a jointly trained artificial neural network and/or (2) the weight of the neural network to the UEs 820. This method may include assigning more significant digits to the UEs 820 associated with better channel conditions and assigning less significant digits to the UEs 820 associated with worse channel conditions. This method also includes the base station 810 training the jointly trained neural network 830 based on the received number of digits from each of the UEs 820.

Figure 9:
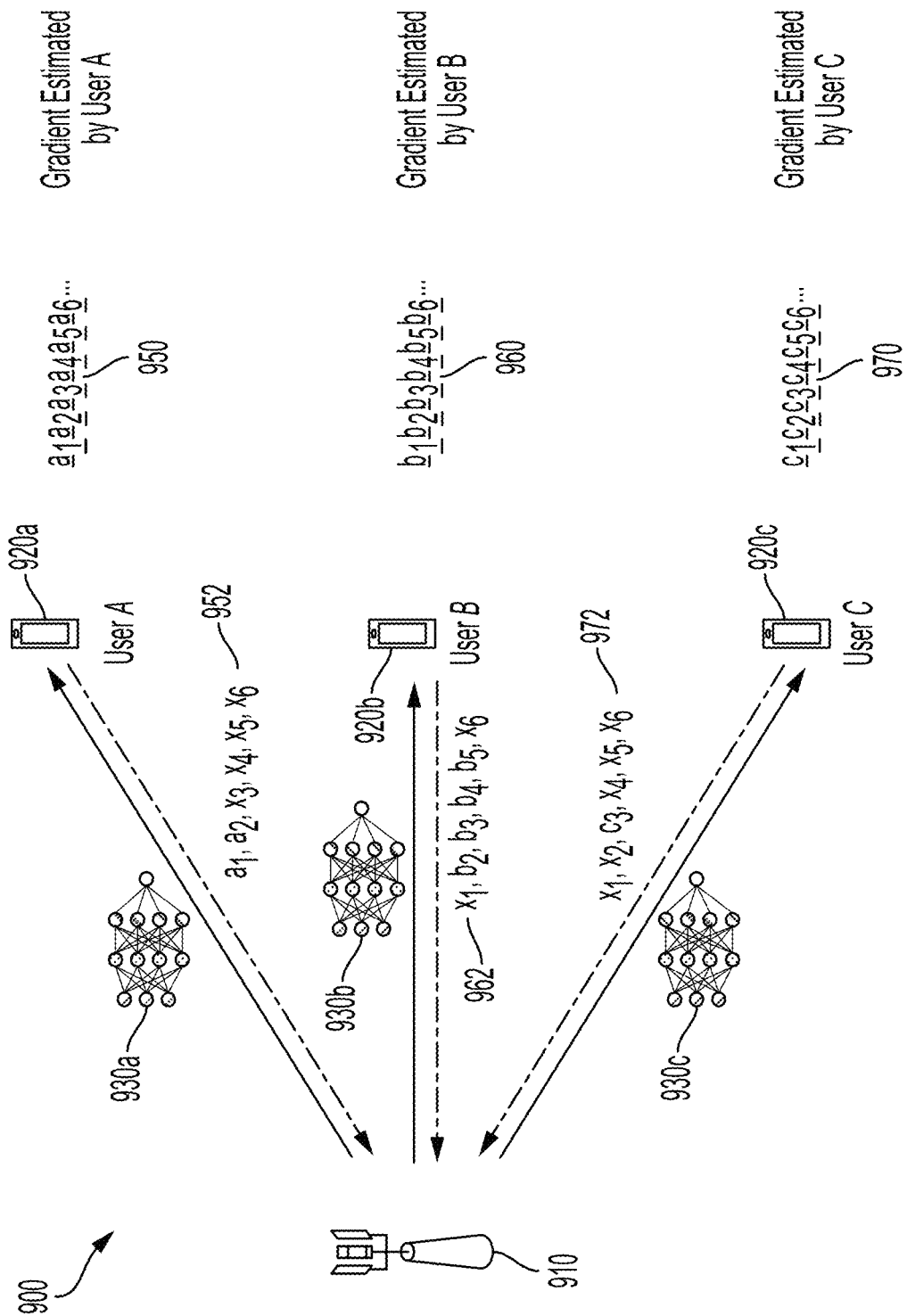
FIG. 9 is a block diagram illustrating federated learning using unequal feedback, according to aspects of the present disclosure.

FIG. 9 is a block diagram illustrating federated learning using unequal feedback, according to aspects of the present disclosure. In one aspect of the present disclosure, a federated learning system 900 performs a process for training a jointly trained neural network 930 (e.g., 930a, 930b, 930c). In this configuration, each UE 920 (e.g., 920a, 920b, 920c) calculates a value representing (1) a gradient estimate of a weight of the neural network and/or (2) the weight of the neural network. Once calculated, each of the UEs 920 (e.g., 920a, 920b, 920c) expands the value into a numerical system with base N into a sequence of digits. The numerical system may be a decimal, binary, or hexadecimal system, for example. The j digits may start from the most significant digit and expand to a least significant digit, according to some aspects of the present disclosure.

As shown in FIG. 9, the UE 920a generates an estimated gradient 950 (e.g., $a_1a_2a_3a_4a_5a_6$ . . . ), the UE 920b generates an estimated gradient 960 (e.g., $b_1b_2b_3b_4b_5b_6$ . . . ), and the UE 920c generates an estimated gradient 970 (e.g., $c_1c_2c_3c_4c_5c_6$ . . . ). Once generated, each of the UEs 920 (e.g., 920a, 920b, 920c) determines a number of digits and digit locations of their estimated gradient (e.g., 950, 960, 970) to transmit based on a task assignment received from a base station 910. For example, assuming a binary system (e.g., base 2), the UE 920a transmits gradient bits 952 (e.g., $a_1, a_2, x_3, x_4, x_5, x_6$) of the estimated gradient 950 to the base station 910. In this example, an $x_n$ represents a non-transmitted gradient bit (e.g., $a_3, a_4, a_5, a_6$) and $a_n$ represents a transmitted gradient bit (e.g., $a_1, a_2$). That is, the UE 920a transmits the most significant bit $a_1$ and the next most significant bit $a_2$ to the base station 910. The UE 920a does not transmit the remaining bits (e.g., $a_3, a_4, a_5, a_6$) of the estimated gradient 950.

In this example, the UE 920b transmits gradient bits 962 (e.g., $x_1, b_2, b_3, b_4, b_5, x_6$) of the estimated gradient 960 to the base station 910. In the example of FIG. 9, the UE 920b does not transmit a most significant bit $b_1$ or a sixth bit $b_6$ to the base station 910. Instead, a second gradient bit $b_2$, a third gradient bit $b_3$, a fourth gradient bit $b_4$, and a fifth gradient bit $b_5$ are transmitted to the base station 910 in the gradient bits 962. In addition, the UE 920c transmits gradient bits 972 (e.g., $x_1, x_2, c_3, x_4, x_5, x_6$) of the estimated gradient 970 to the base station 910. The UE 920c does not transmit a most significant bit $c_1$, a second bit $c_2$, a fourth bit $c_4$, a fifth bit $c_5$, or a sixth bit $c_6$ to the base station 910. Instead, the third gradient bit $c_3$, is transmitted to the base station 910 in the gradient bits 972.

Each of the UEs 920 (e.g., 920a, 920b, 920c) is instructed to transmit with a particular number of digits. The particular number may be different for different UEs. In some aspects of the present disclosure, the base station also indicates specific digit locations within the estimated gradients (e.g., 950, 960, 970) for transmitting to the base station 910. In this aspect of the present disclosure, the estimated gradient feedback in the gradient bits (e.g., 952, 962, 972) from the UEs 920 is unequal. The base station 910 may adjust the requested gradient feedback according to channel conditions, quality of the gradient estimates and weights, or other metric determined by the base station 910. Although described with reference to estimated gradients (e.g., 950, 960, 970), it should be recognized that aspects of the present disclosure also apply to computed weights of the jointly trained neural network 930.

For estimated gradient vectors (e.g., 950, 960, 970), the proposed method may apply for all or some of the entries of the vector. In other aspects, the method may apply to a specific direction of the vector. For example, the method may apply to a projection of the estimated gradient vector over the specific direction. This method may include assigning a greater number of significant digits to UEs 920 (e.g., 920a, 920b, 920c) associated with better channel conditions and assigning fewer digits or less significant digits to UEs 920 associated with worse channel conditions. This method also includes the base station 910 training the jointly trained neural network 930 based on the received digits from each of the UEs 920.

Figure 10:
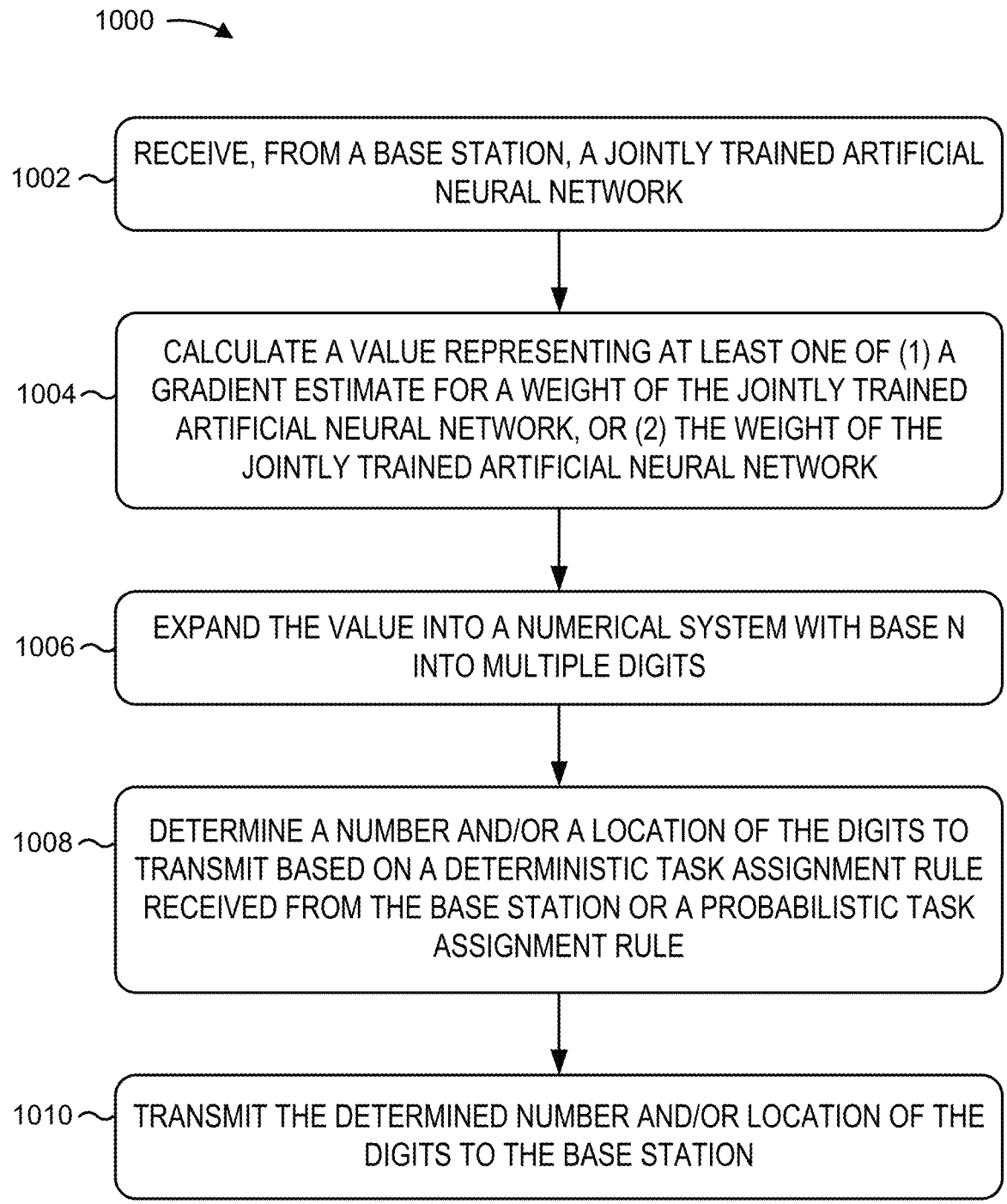
FIG. 10 is a flow diagram illustrating an example federated learning process performed, for example, by a user equipment (UE), in accordance with various aspects of the present disclosure.

FIG. 10 is a flow diagram illustrating an example process 1000 performed, for example, by a user equipment (UE) based on a method of wireless communication, in accordance with various aspects of the present disclosure. The example process 1000 is an example of a UE enhancement using federated learning with varying feedback bits.

As shown in FIG. 10, in some aspects of the present disclosure, the process 1000 includes receiving, from a base station, a jointly trained artificial neural network (block 1002). For example, the UE (e.g., using the antenna 252, the DEMOD/MOD 254, the MIMO detector 256, the receive processor 258, the controller/processor 280, and/or the memory 282 as shown in FIG. 2) may receive the jointly trained artificial neural network. For example, as shown in FIG. 7, a federated learning system 700 performs a process for training a jointly trained artificial neural network 730 (e.g., 730a, 730b, 730c), in which the jointly trained artificial neural network 730 is received by each UE 720 (e.g., 720a, 720b, 720c).

In some aspects of the present disclosure, the process 1000 also includes calculating a value representing at least one of (1) a gradient estimate for a weight of the jointly trained artificial neural network, or (2) the weight of the jointly trained artificial neural network (block 1004). For example, the UE (e.g., using the controller/processor 280, and/or the memory 282) may calculate the value representing the gradient estimate or the weight of the jointly trained artificial neural network. For example, as shown in FIG. 7, in response to receiving the jointly trained artificial neural network 730, each UE 720 calculates an estimated gradient and/or the weights of the jointly trained artificial neural network 730.

In some aspects of the present disclosure, the process 1000 further includes expanding the value into a numerical system with base N into a plurality of digits (block 1006). For example, the UE (e.g., using the controller/processor 280, and/or the memory 282) may expand the value into the numerical system. For example, the numerical system with the base N may be a binary system, in which N is two. In addition, the value may represent a vector, in which a determination is applied to all elements of the vector. The determination may apply to only some of the elements of the vector, or the determination applies to a projection of the vector over a specific direction.

In some aspects of the present disclosure, the process 1000 further includes determining a number and/or a location of the plurality of digits to transmit based on a deterministic task assignment rule received from the base station or a probabilistic task assignment rule (block 1008). For example, the UE (e.g., using the controller/processor 280, and/or the memory 282) may determine the number and/or the location of the plurality of digits to transmit. For example, as shown in FIG. 7, the UEs 720 determine whether to transmit a j'th digit of the digits of the estimated gradient or weight (e.g., 750, 760, 770) based on a probability function. Alternatively, as shown in FIG. 8, each of the UEs 820 determines whether to transmit a location, such as each j'th digit of their estimated gradient (e.g., 850, 860, 870) based on a deterministic task assignment rule received from the base station 810. Otherwise, as shown in FIG. 9, each of the UEs 920 determines the number of digits and digit locations of their estimated gradient to transmit based on a task assignment received from the base station 910.

In some aspects of the present disclosure, the process 1000 further includes transmitting the determined number and/or location of the plurality of digits to the base station (block 1010). For example, the UE (e.g., using the antenna 252, the DEMOD/MOD 254, the TX MIMO processor 266, the transmit processor 264, the controller/processor 280, and/or the memory 282) may transmit the determined number and/or location of the plurality of digits to the base station. For example, as shown in FIG. 7, the UEs 720 transmit each of the digits of the estimated gradient or weight (e.g., 750, 760, 770) to the base station 710, for each j'th digit that is determined to be transmitted. In this example, the UE 720b does not transmit the first gradient bit $b_1$, the fourth gradient bit $b_4$, or the fifth gradient bit $b_5$ of the estimated gradient 760 to the base station 710.

Alternatively, as shown in FIG. 8, the estimated gradient feedback in the gradient bits (e.g., 852, 862, 872) from the UEs 820 is divided according to channel conditions, quality of the gradient estimates and weights, or other deterministic metrics determined by the base station. Otherwise, as shown in FIG. 9, the estimated gradient feedback in the gradient bits (e.g., 952, 962, 972) from the UEs 920 is unequal. The base station 910 may adjust the requested gradient feedback according to channel conditions, quality of the gradient estimates and weights, or other metric determined by the base station 910.

Figure 11:
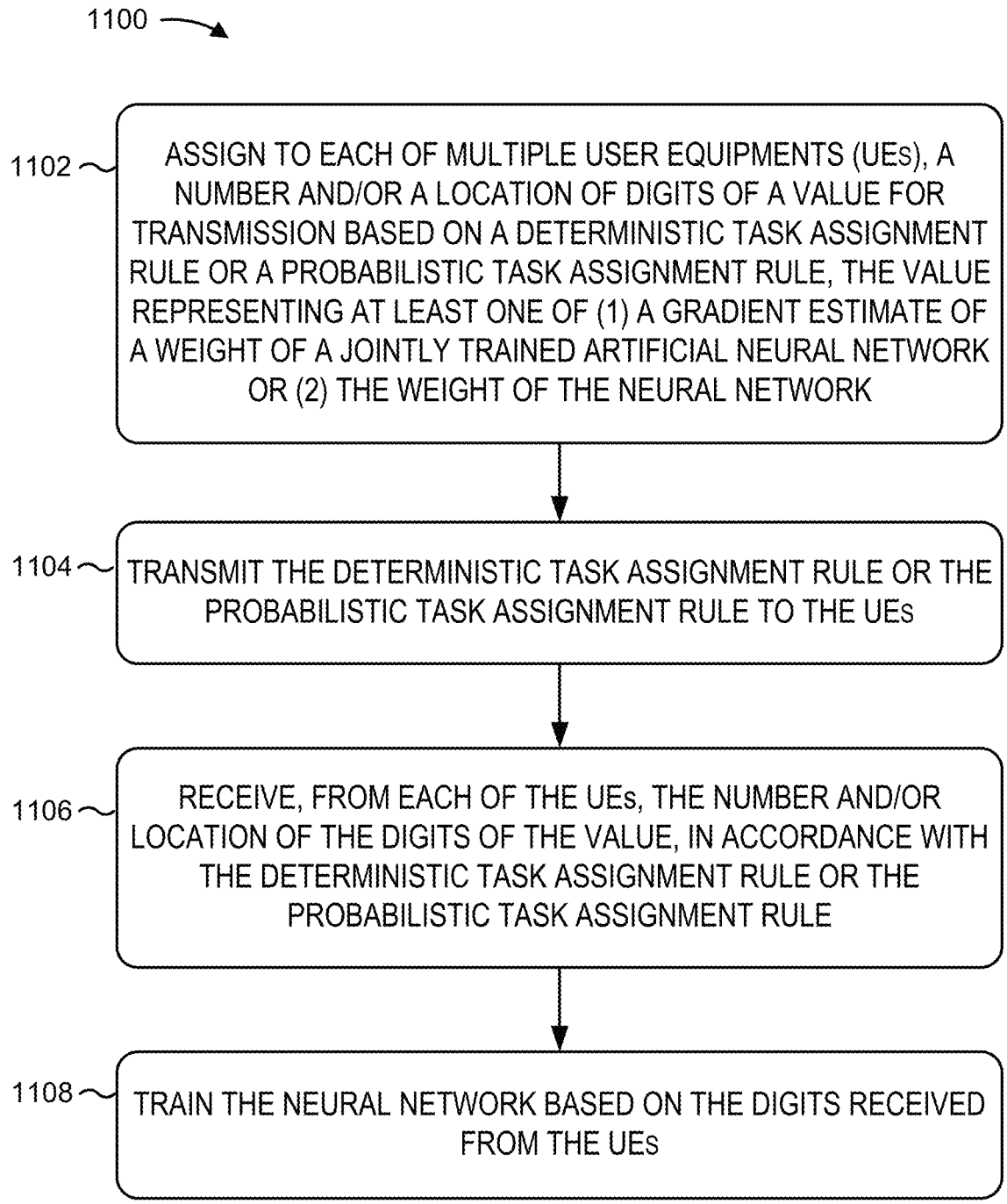
FIG. 11 is a flow diagram illustrating an example federated learning process performed, for example, by a base station, in accordance with various aspects of the present disclosure.

FIG. 11 is a flow diagram illustrating an example process 1100 performed, for example, by a base station, in accordance with various aspects of the present disclosure. The example process 1100 is an example of a base station enhancement with federated learning using varying feedback bits.

As shown in FIG. 11, in some aspects of the present disclosure, the process 1100 includes assigning to each of a group of UEs, a number and/or a location of digits of a value for transmission is based on a deterministic task assignment rule or a probabilistic task assignment rule. The value represents at least one of (1) a gradient estimate of a weight of a jointly trained artificial neural network, or (2) the weight of the neural network (block 1102). For example, the base station (e.g., using the controller/processor 240, and/or the memory 242 of FIG. 2) may assign the number and/or the location of digits of the value for transmission.

For example, as shown in FIG. 7, the base station 710 transmits a probability function to the UEs 720. Alternatively, as shown in FIG. 8, the base station 810 transmits a deterministic task assignment rule to the UEs 820 for providing divided feedback of the estimated gradient or weight (e.g., 850, 860, 870). Otherwise, as shown in FIG. 9, the base station 910 transmits a deterministic task assignment rule to the UEs 920 for providing unequal feedback of the estimated gradient or weight (e.g., 950, 960, 970). In some aspects of the present disclosure, the process 1100 includes assigning a higher number of significant digits to UEs associated with better channel conditions and assigning a lower number of significant digits to UEs associated with worse channel conditions.

In some aspects of the present disclosure, the process 1100 also includes transmitting the deterministic task assignment rule or the probabilistic task assignment rule to the UEs (block 1104). For example, the base station (e.g., using the antenna 234, the DEMOD/MOD 232, the TX MIMO processor 230, the transmit processor 220, the controller/processor 240, and/or the memory 242) may transmit the deterministic task assignment rule or the probabilistic task assignment rule to the UEs. For example, as shown in FIG. 7, the base station 710 transmits a probability function to the UEs 720 to determine whether to transmit a j'th digit of the digits of the estimated gradient or weight (e.g., 750, 760, 770). Alternatively, as shown in FIG. 8, the base station 810 transmits a deterministic task assignment rule to each of the UEs 820 to determine whether to transmit a location, such as each j'th digit of their estimated gradient (e.g., 850, 860, 870). Otherwise, as shown in FIG. 9, the base station 910 transmits a deterministic task assignment rule to each of the UEs 920 for determining the number of digits and digit locations of their estimated gradient to transmit.

In some aspects of the present disclosure, the process 1100 further includes receiving, from each of the UEs, multiple digits of the value, in accordance with the deterministic task assignment rule or the probabilistic task assignment rule (block 1106). For example, the base station (e.g., using the antenna 234, the DEMOD/MOD 232, the MIMO detector 236, the receive processor 238, the controller/processor 240, and/or the memory 242) may receive the digits of the value. For example, as shown in FIG. 7, the base station 710 receives a j'th digit of the digits of the estimated gradients or weights (e.g., 750, 760, 770) based on the probability function. Alternatively, as shown in FIG. 8, the base station 810 receives a location, such as each j'th digit of the estimated gradients or weights (e.g., 850, 860, 870) based on the deterministic task assignment rule. Otherwise, as shown in FIG. 9, the base station 910 receives the number of digits and digit locations of the estimated gradients or weights (e.g., 950, 960, 970) based on the deterministic task assignment rule.

In some aspects of the present disclosure, the process 1100 further includes training the neural network based on the digits received from the UEs (block 1108). For example, the base station (e.g., using the controller/processor 240, and/or the memory 242) may train the neural network based on the digits received from the UEs. For example, as shown in FIG. 7, the base station 710 trains the jointly trained artificial neural network 730 based on the received j'th digit of the digits of the estimated gradients or weights (e.g., 750, 760, 770) based on the probability function. Alternatively, as shown in FIG. 8, the base station 810 trains the jointly trained neural network 830 based on the received location, such as each j'th digit of the estimated gradients or weights (e.g., 850, 860, 870) based on the deterministic task assignment rule. Otherwise, as shown in FIG. 9, the base station 910 trains the jointly trained neural network 930 based on the received number of digits and digit locations of the estimated gradients or weights (e.g., 950, 960, 970) based on the deterministic task assignment rule.

Implementation examples are described in the following numbered clauses:

1. A method of wireless communication, by a user equipment (UE), comprising:
  receiving, from a base station, a jointly trained artificial neural network;
  calculating a value representing at least one of (1) a gradient estimate for a weight of the jointly trained artificial neural network, or (2) the weight of the jointly trained artificial neural network;
  expanding the value into a numerical system with base N into a plurality of digits;
  determining a number and/or a location of the plurality of digits to transmit based on a deterministic task assignment rule received from the base station or a probabilistic task assignment rule; and
  transmitting the determined number and/or the determined location of the plurality of digits to the base station.
2. The method of clause 1, in which the determining comprises determining whether to transmit a j'th digit of the plurality of digits based on the probabilistic task assignment rule, in which the probabilistic task assignment rule for the j'th digit comprises 1/Nj, and in which j increases starting from a most significant digit to a least significant digit.
3. The method of clause 1, in which the determining comprises determining whether to transmit a j'th digit of the plurality of digits based on the deterministic task assignment rule received from the base station, in which j increases starting from a most significant digit to a least significant digit.
4. The method of any one of clauses 1-3, in which transmitting starts from a most significant digit and progresses to a least significant digit.
5. The method of any one of clauses 1-4, in which the numerical system of base N comprises a binary system where N is two.
6. The method of any one of clauses 1-5, further comprising receiving the probabilistic task assignment rule from the base station.
7. The method of any one of clauses 1-5, in which the probabilistic task assignment rule is equal to a preset value for at least one of the plurality of digits.
8. The method of any one of clauses 1-7, in which the value comprises a vector and the determining applies to all components of the vector.
9. The method of any one of clauses 1-7, in which the value comprises a vector and the determining applies to only some components of the vector.
10. The method of any one of clauses 1-7, in which the value comprises a vector and the determining applies to a projection of the vector over a specific direction.
11. A method of wireless communication, by a base station, comprising:
  assigning to each of a plurality of user equipments (UEs), a number and/or a location of digits of a value for transmission based on a deterministic task assignment rule or a probabilistic task assignment rule, the value representing at least one of (1) a gradient estimate of a weight of a jointly trained artificial neural network or (2) the weight of the neural network;
  transmitting the deterministic task assignment rule or the probabilistic task assignment rule to the plurality of UEs;
  receiving, from each of the plurality of UEs, the number and/or location of a plurality of digits of the value, in accordance with the assigning; and
  training the neural network based on the plurality of digits received from the plurality of UEs.

12. The method of clause 11, in which the assigning comprises:
calculating a probability function for each digit of the value according to the probabilistic task assignment rule; and
transmitting the probability function to the plurality of UEs.
13. The method of clause 12, in which the calculating is based on a channel condition estimate for each of the plurality of UEs.
14. The method of clause 12, in which the calculating is based on an amount of distortion caused by error in each of the plurality of digits of the value, for each of the plurality of UEs.
15. The method of any one of clauses 12-14, in which the probability function is equal to one for at least one of the plurality of digits for at least one of the plurality of UEs.
16. The method of any one of clauses 12-14, in which the probability function is different for different UEs.
17. The method of any one of clauses 11-16, in which the assigning is based on a channel condition estimate for each of the plurality of UEs.
18. The method of any one of clauses 11-16, in which the assigning is based on an amount of distortion to the gradient estimate or the weight, which is caused by error in each digit, for each of the plurality of UEs.
19. The method of any one of clauses 11-16, in which the assigning comprises assigning more significant digits to UEs associated with better channel conditions and assigning less significant digits to UEs associated with worse channel conditions.
20. The method of any one of clauses 11-16, in which the assigning comprises assigning a higher number of significant digits to UEs associated with better channel conditions and assigning a lower number of significant digits to UEs associated with worse channel conditions.
21. A user equipment (UE), comprising a processor, a memory coupled with the processor; and instructions stored in the memory and operable, when executed by the processor, to cause the UE to perform the method of any one of clauses 1-10.
22. A base station, comprising a processor, a memory coupled with the processor; and instructions stored in the memory and operable, when executed by the processor, to cause the base station to perform the method of any one of clauses 11-20.
23. An apparatus for wireless communication comprising one or more means for performing the functions of the method of any one of clauses 1-10.
24. An apparatus for wireless communication comprising one or more means for performing the functions of the method of any one of clauses 11-20.
25. A non-transitory computer-readable medium having program code recorded thereon, the program code executable by a processor and comprising program code to perform the functions of the method of any one of clauses 1-10.
26. A non-transitory computer-readable medium having program code recorded thereon, the program code executable by a processor and comprising program code to perform the functions of the method of any one of clauses 11-20.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:
1. A method of wireless communication, by a user equipment (UE), comprising:
receiving, from a base station, a jointly trained artificial neural network;
calculating a value representing at least one of (1) a gradient estimate for a weight of the jointly trained artificial neural network, or (2) the weight of the jointly trained artificial neural network;
expanding the value into a numerical system with base N into a plurality of digits;
determining a number of digits and/or digit locations of the plurality of digits to transmit based on a determin- istic task assignment rule received from the base station or a probabilistic task assignment rule;

transmitting the determined number of digits and/or the determined digit locations of the plurality of digits to the base station; and operating, by the UE, according to an artificial neural network trained by the base station based on the plurality of digits transmitted to the base station.

2. The method of claim 1, in which the determining comprises determining whether to transmit a j'th digit of the plurality of digits based on the probabilistic task assignment rule, in which the probabilistic task assignment rule for the j'th digit comprises 1/Nj, and in which j increases starting from a most significant digit to a least significant digit.

3. The method of claim 1, in which the determining comprises determining whether to transmit a j'th digit of the plurality of digits based on the deterministic task assignment rule received from the base station, in which j increases starting from a most significant digit to a least significant digit.

4. The method of claim 1, in which transmitting starts from a most significant digit and progresses to a least significant digit.

5. The method of claim 1, in which the numerical system of base N comprises a binary system where N is two.

6. The method of claim 1, further comprising receiving the probabilistic task assignment rule from the base station.

7. The method of claim 1, in which the probabilistic task assignment rule is equal to a preset value for at least one of the plurality of digits.

8. The method of claim 1, in which the value comprises a vector and the determining applies to all components of the vector.

9. The method of claim 1, in which the value comprises a vector and the determining applies to only some components of the vector.

10. The method of claim 1, in which the value comprises a vector and the determining applies to a projection of the vector over a specific direction.

11. A method of wireless communication, by a base station, comprising:

assigning to each of a plurality of user equipments (UEs), a number of digits and/or digit locations of a value for transmission based on a deterministic task assignment rule or a probabilistic task assignment rule, the value representing at least one of (1) a gradient estimate of a weight of a jointly trained artificial neural network or (2) the weight of the jointly trained artificial neural network;

transmitting the deterministic task assignment rule or the probabilistic task assignment rule to the plurality of UEs;

receiving, from each of the plurality of UEs, the number of digits and/or digit locations of a plurality of digits of the value, in accordance with the assigning;

training the jointly trained artificial neural network based on the plurality of digits received from the plurality of UEs; and transmitting the jointly trained artificial neural network to the plurality of UEs for operation of the plurality of UEs according to the jointly trained artificial neural network.

12. The method of claim 11, in which the assigning comprises:

calculating a probability function for each digit of the value according to the probabilistic task assignment rule; and transmitting the probability function to the plurality of UEs.

13. The method of claim 12, in which the calculating is based on a channel condition estimate for each of the plurality of UEs.

14. The method of claim 12, in which the calculating is based on an amount of distortion caused by error in each of the plurality of digits of the value, for each of the plurality of UEs.

15. The method of claim 12, in which the probability function is equal to one for at least one of the plurality of digits for at least one of the plurality of UEs.

16. The method of claim 12, in which the probability function is different for different UEs.

17. The method of claim 11, in which the assigning is based on a channel condition estimate for each of the plurality of UEs.

18. The method of claim 11, in which the assigning is based on an amount of distortion to the gradient estimate or the weight, which is caused by error in each digit, for each of the plurality of UEs.

19. The method of claim 11, in which the assigning comprises assigning more significant digits to UEs associated with better channel conditions and assigning less significant digits to UEs associated with worse channel conditions.

20. The method of claim 11, in which the assigning comprises assigning a higher number of significant digits to UEs associated with better channel conditions and assigning a lower number of significant digits to UEs associated with worse channel conditions.

21. A user equipment (UE), comprising:

a processor;

a memory coupled with the processor; and instructions stored in the memory and operable, when executed by the processor, to cause the UE:

to receive, from a base station, a jointly trained artificial neural network;

to calculate a value representing at least one of (1) a gradient estimate for a weight of the jointly trained artificial neural network, or (2) the weight of the jointly trained artificial neural network;

to expand the value into a numerical system with base N into a plurality of digits;

to determine a number of digits and/or digit locations of the plurality of digits to transmit based on a deterministic task assignment rule received from the base station or a probabilistic task assignment rule;

to transmit the determined number of digits and/or the determined digit locations of the plurality of digits to the base station; and to operate, by the UE, according to an artificial neural network trained by the base station based on the plurality of digits transmitted to the base station.

22. The UE of claim 21, in which the instructions to determine further causes the UE to determine whether to transmit a j'th digit of the plurality of digits based on the probabilistic task assignment rule, in which the probabilistic task assignment rule for the j'th digit comprises 1/Nj, and in which j increases starting from a most significant digit to a least significant digit.

23. The UE of claim 21, in which the instructions to determine further causes the UE to determine whether to transmit a j'th digit of the plurality of digits based on the deterministic task assignment rule received from the base station, in which j increases starting from a most significant digit to a least significant digit.

24. The UE of claim 21, in which the instructions to transmit further causes the UE to start from a most significant digit and progresses to a least significant digit.

25. The UE of claim 21, in which the numerical system of base N comprises a binary system where N is two.

26. A base station, comprising:
a processor;
a memory coupled with the processor; and
instructions stored in the memory and operable, when executed by the processor, to cause the base station:
to assign to each of a plurality of user equipments (UEs), a number digits and/or digit locations of a value for transmission based on a deterministic task assignment rule or a probabilistic task assignment rule, the value representing at least one of (1) a gradient estimate of a weight of a jointly trained artificial neural network or (2) the weight of the jointly trained artificial neural network;
to transmit the deterministic task assignment rule or the probabilistic task assignment rule to the plurality of UEs;
to receive, from each of the plurality of UEs, the number of digits and/or digit locations of a plurality of digits of the value, in accordance with the assigning;
to train the jointly trained artificial neural network based on the plurality of digits received from the plurality of UEs; and
to transmit the jointly trained artificial neural network to the plurality of UEs for operation of the plurality of UEs according to the jointly trained artificial neural network.

27. The base station of claim 26, in which the instructions to assign further cause the base station:
to calculate a probability function for each digit of the value according to the probabilistic task assignment rule; and
to transmit the probability function to the plurality of UEs.

28. The base station of claim 27, in which the instructions to calculate are based on a channel condition estimate for each of the plurality of UEs.

29. The base station of claim 27, in which the instructions to calculate are based on an amount of distortion caused by error in each of the plurality of digits of the value, for each of the plurality of UEs.

30. The base station of claim 27, in which the probability function is equal to one for at least one of the plurality of digits for at least one of the plurality of UEs.

* * * * *